(12) United States Patent
Mika et al.

(10) Patent No.: US 8,319,955 B2
(45) Date of Patent: Nov. 27, 2012

(54) DEVICE AND METHOD FOR DETERMINING A POSITION AND ORIENTATION

(76) Inventors: Thorsten Mika, Leichlingen (DE); Hendrik Fehlis, Siegburg (DE)

( * ) Notice: Subject to any disclaimer, the term of this patent is extended or adjusted under 35 U.S.C. 154(b) by 329 days.

(21) Appl. No.: 12/668,946

(22) PCT Filed: Jul. 8, 2008

(86) PCT No.: PCT/EP2008/058839
§ 371 (c)(1), (2), (4) Date: May 14, 2010

(87) PCT Pub. No.: WO2009/010421
PCT Pub. Date: Jan. 22, 2009

(65) Prior Publication Data
US 2011/0170118 A1 Jul. 14, 2011

(30) Foreign Application Priority Data
Jul. 13, 2007 (DE) .......................... 10 2007 033 102

(51) Int. Cl.
*G01N 21/00* (2006.01)
(52) U.S. Cl. ........................................................ 356/72
(58) Field of Classification Search .................... 356/72, 356/614; 116/62.1; 324/207.13
See application file for complete search history.

(56) References Cited

U.S. PATENT DOCUMENTS

| 4,847,773 A | 7/1989 | Van Helsdingen et al. |
| 6,377,888 B1 | 4/2002 | Olch |
| 2004/0221790 A1 * | 11/2004 | Sinclair et al. ............... 116/62.1 |

FOREIGN PATENT DOCUMENTS

| EP | 1 455 252 A2 | 9/2004 |
| EP | 1 658 937 A | 5/2006 |
| GB | 2 259 823 A | 3/1993 |

OTHER PUBLICATIONS

International Search Report for International Application No. PCT/EP2008/058839.

* cited by examiner

*Primary Examiner* — Tarifur Chowdhury
*Assistant Examiner* — Abdullahi Nur
(74) *Attorney, Agent, or Firm* — McCarter & English, LLP

(57) ABSTRACT

The invention relates to a device for determining the position and orientation of a movable object. The latter exhibits at least two relative sensors (24) on the object, which register a change in the position and/or orientation of the object, and at least two absolute sensors (26) on the object, each for determining the absolute position in an X direction and Y direction in relation to a substrate (20). The invention further relates to a method for determining the position and orientation.

6 Claims, 1 Drawing Sheet

DEVICE AND METHOD FOR DETERMINING A POSITION AND ORIENTATION

CROSS-REFERENCE TO RELATED APPLICATIONS

This application is the U.S. National Phase of International Application No. PCT/EP2008/058839, entitled "Device and Method for Determining a Position and Orientation," filed Jul. 8, 2008, which claims priority to German Patent Application No. DE 10 2007 033 102.0, filed Jul. 13, 2007, the disclosures of which are hereby incorporated by reference in their entireties.

BACKGROUND OF THE INVENTION

The present invention relates to a device for determining the position and orientation of a movable object. The invention further relates to a corresponding method.

Determining the position of objects, for example vehicles, robots and the like, in an x-direction and/or y-direction has been long established practice. For example, using a GPS to determine the position of vehicles is known, but is only possible if a corresponding receiver can receive signals from the associated satellites. This is often difficult in interior spaces, so that other methods and devices are resorted to there.

For example, determining the position of objects or motor vehicles in interior spaces is necessary for industrial vehicles (forklifts, rack systems, etc.) to measure and control mobile robots, and for virtual studios to remotely operate cameras. In all applications, the position must be known almost at all times. In addition to the position of the vehicle in a two-dimensional plane, its spatial orientation of often an essential criterion. Orientation in this sense refers to the rotation of the object or vehicle around its vertical axis, for example the alignment or pivoting angle of a camera in a television studio. Not just the position of the vehicle (on which the camera is located) is important for this application, but also its twisting or the twisting of the camera around the vertical axis constitutes important information, since the latter significantly influences the image to be recorded. It is also pivotal that the position be known not just at rest, but also in transit or motion. Therefore, the position and orientation must be calculated in real time.

EP 1 455 253 A2 discloses a system for determining the absolute position, for example a camera. The system is essentially based upon covering a studio floor with circular markers that each exhibit an individual pattern. The position of the individual markers is known. The camera has a sensor that takes 20 images/second of the patterns on the studio floor, wherein the markers are used to detect the absolute position. It is here essential that not just one marker be evaluated, but also those markers that surround the latter.

The simultaneous recording of several adjacent markers also enables the unambiguous allocation of a central marker. In addition to recognizing the position, rotation can also be determined from the image of a sensor or two sensors. This system has proven itself from the standpoint that it enables a highly accurate determination of position at any time. However, the disadvantage has had to do with the special configuration of the studio floor. The pattern yielded by the markers is frequently viewed as disruptive and disadvantageous, so that the system is often not put to use. Another key disadvantage is that such a floor covering does not completely disappear when the real image is blended with a virtual image, which is frequently the case in studio productions, which does occur, for example, in the remainder of a blue studio. In addition, the markers get dirty over time, which can result in erroneous information. For this reason, the studio floor must be kept very clean.

In addition, applying the specially imprinted floor, e.g., made of PVC, on-site is associated with considerable expense. It is virtually impossible to outfit an existing studio with a new studio floor, since all equipment and furniture must first be removed for this purpose. Further, the floor imprinted with markers must be installed identically given the fixed position of the individual markers.

Also known are odometric systems, in which the position of a vehicle is determined by observing its wheels. However, the disadvantage to this fundamental navigation method for land-bound vehicles of all kind is that the position measurement is subject to a plurality of influencing variables that often result in too great a deviation from reality. These include wheel geometry (runout, wear), composition of the ground (unevenness, dirt), chassis geometry (play, erroneous measurement of wheel distances and steering gear) and the vehicle weight (uneven distribution of weight; greater load and deformation on individual wheels).

The biggest error stems from the fact that the wheel "slips" when driving through a curve; the rigid wheel expands vertically to the traveling direction, and the radius of the inner edge of the wheel differs relative to the outer edge in the case of a curve. In addition, the wheel does not precisely follow the curve trajectory, but rather most often slips more straight ahead.

All of these errors are incorporated in the position difference that is added to the last known position. As a result, the errors add up with each measuring step, leading to an ever-growing deviation during a more prolonged measurement. This deviation in odometric position calculation is virtually impossible to avoid, even if all error influences are minimized. In particular, it is necessary to drive the vehicles to a known initial position at regular intervals, so as to begin determining the position again from there. This is necessary in particular if the vehicle was often moved back and forth or drove through curves, since the error frequency increases during such movements.

GB 2259823 A describes another method for absolute position determination. In this method, the walls of a room are provided with a plurality of reflectors having an unambiguous code. The position of each individual reflector is known, and the code allows it to be unambiguously allocated. Situated in proximity to the camera is a light source, which shines on the reflectors, so that a sensor, e.g., a camera, can detect the reflected light or signal. the position can be determined relatively precisely based on the recorded and unambiguously allocated reflected signals However, the disadvantage to this method is that many reflectors have to be present, and that the reflectors can often not be uniformly arranged because they are covered by objects such as studio furniture or doors, other cameras or camera personnel. Finally, the reflectors affixed to the walls might also subsequently become obscured by persons or other objects, which in this relatively sensitive system leads to errors or calculation deficiencies.

SUMMARY OF THE INVENTION

The object of the present invention is to create a device and method for two-dimensionally determining the position and orientation of a movable object, which enables a sufficiently accurate determination of the required parameters, while at the same time can be manufactured and installed inexpensively and easily. It must be possible to adjust the device and method to a wide variety of circumstances on site, thereby enabling their use under nearly any conditions. Finally, the device and method must necessitate as few changes as possible on site. The position and orientation are here to be determined in real time, if possible.

According to the invention, the object is achieved by means of devices with the features disclosed herein and methods with the procedural steps disclosed herein.

According to the invention, the necessary parameters are determined in two stages, specifically in relative and absolute terms. In this connection, relative parameter determination is understood to mean that only a change in comparison to the previous measured is registered, for example movement and path in a specific direction. Suitable for this purpose are magnetic or optical methods or devices, among others. The optical method can be one that is also used given an optical computer mouse, for example. The mode of operation is based on modern image processing. A surface sensor chip that essentially functions as a small camera with a computing unit continuously takes pictures of the substrate. In the process, the substrate is most often illuminated by a light-emitting diode or laser diode. The light reflected by the substrate is bundled with a lens, and gets into the miniature camera of the mouse sensor chip. The shift relative to the previous position is there calculated, and that information is then used to finally determine the movement data in the X and Y direction. In the process, the microprocessor computes the corresponding direction and velocity of mouse motion based on the differences between consecutively recorded images.

When using optical sensors, the latter must be aligned in the direction of the substrate if possible, in order to thereby be able to determine movements accordingly similarly to an optical mouse. Given a rare case in which the mouse is so clean and smooth that the system of the optical mouse cannot function, corresponding minimal markings can be provided on the substrate, if necessary.

However, this is usually not required, since modern optical systems can already utilize structures in the surface of materials for evaluating the movement. The patterns can basically be designed in the visible or invisible spectrum (infrared, ultraviolet) with respect to optical scanning. Also conceivable is the use of devices based on the conventional trackball system. For example, these can be incorporate in feet of the vehicle.

Also conceivable for relative parameter determination is the use of odometric sensors, which are prone to error, but initially provide sufficiently precise data in terms of the relatively short distance between the measured parameters.

It is significant that object is provided with at least two sensors to determine the relative parameters. Only in this way can orientation be determined. For example, if the object is formed by a vehicle with an essentially rectangular cross section, arranging one sensor at each corner of the vehicle would be sufficient to determine a rotation around a vertical axis (vertical axis).

Determining the relative parameters is easy and inexpensive. However, the latter as implemented often is not adequate, or errors add up to yield unacceptable overall errors. Therefore, the invention provides for determining absolute parameters with respect to position and orientation on a frequent enough basis. Accordingly, additional sensors are provided to detect the absolute position. These sensors can basically be combined in a device with the sensors for detecting the relative parameters (camera as surface sensor). However, completely separate sensors are also conceivable, depending on the application.

In a simplest variant according to the invention, the absolute position is determined by applying markings with known positions onto the substrate in the form of lines. The lines can vary in design for purposes of differentiation. If the object or vehicle moves over this line, the absolute position is automatically determined during operation. This position and orientation determination then serves as a new starting point for the relative parameters to be ascertained subsequently. Depending on the requirement, lines or patterns (a grid pattern, for example) can be spaced further apart or closer together. The closer together the markings are arranged, the more often the absolute position of the object is determined.

For example, optical or magnetic systems have proven suitable as sensors for determining the absolute position. Contrast mark scanners (light barrier systems) or a line-scanning camera would be easy to install and use, for example. Also conceivable is the use of magnetic strips as the markings, the field strength of which can also be used to determine the position. Finally conceivable as well are simple measuring methods, for example ones based on elevations of the substrate. In the latter, a pointer extending downward toward the floor from the object or vehicle touches an edge, thereby receiving a pulse with which the absolute position can be determined.

Basically conceivable are all types of markings that enable the determination of absolute position in conjunction with corresponding sensors. For example, a marking strip is also conceivable, which in turn is divided by transverse lines along its longitudinal axis, much as a folding measure or ruler. Therefore, a corresponding sensor is able to immediately determine the exact position in both the X and Y direction. To this end, it is only necessary that the division [sic] or of the line take place in regular, unambiguously allocatable steps and markings.

The orientation of the object is also ascertained from an evaluation of two sensors when determining the absolute position, so that the orientation can also be determined.

As an alternative to determining the absolute position and orientation via markings on the substrate, the invention makes it possible to use markings in the vicinity or adjacent to the surface to be traversed by the object. For example, the walls of a room can be provided with linear reflectors having a known position, which are to be allocated in an unambiguous fashion. A light source on the object emits corresponding light, which is reflected and thrown back toward the object. A corresponding sensor, for example a conventional CCD line-scanning camera, records the reflected light from at least three reflectors and calculates the absolute position based thereupon. If there are no walls to which to affix the reflectors, the latter can also be hung from a ceiling or set up on supports. It is only important that their respective position be unambiguously known. This system also uses relatively operating sensors to determine the position and orientation, wherein the absolute parameters are ascertained at regular chronological intervals or as a function of the traversed path, for example. The frequency with which the absolute parameters are determined is here completely optional as well, depending on the requirements. The ascertained absolute position is also taken as the starting point for the ensuing relative measurements in this system.

Instead of using the lines as markings to determine the absolute parameters, other forms, such as points or alphanumeric characters, are also conceivable.

A camera with surface sensor can ideally assume the function of the two respective sensors, i.e., the relative and absolute sensors. This means that only two cameras need be situated on the object.

One significant advantage to the invention lies in the fact that the absolute parameters are determined while using the object, e.g., while recording a transmission by a camera, as opposed to known systems. In previously used systems, the absolute parameters are only determined at a single location, the so-called "home position", and as a rule prior to or upon interruption of the transmission, while the absolute parameters in the system according to the invention are, so to speak, continuously determined and used, even during the recording process. Calibration takes place routinely and in real time.

The invention will be explained in greater detail based on the description to the figures below. These are only to be construed as examples, serving only to explain the invention. Other embodiments are essentially also possible. It is shown:

DETAILED DESCRIPTION OF EMBODIMENTS OF THE INVENTION

Figure 1:
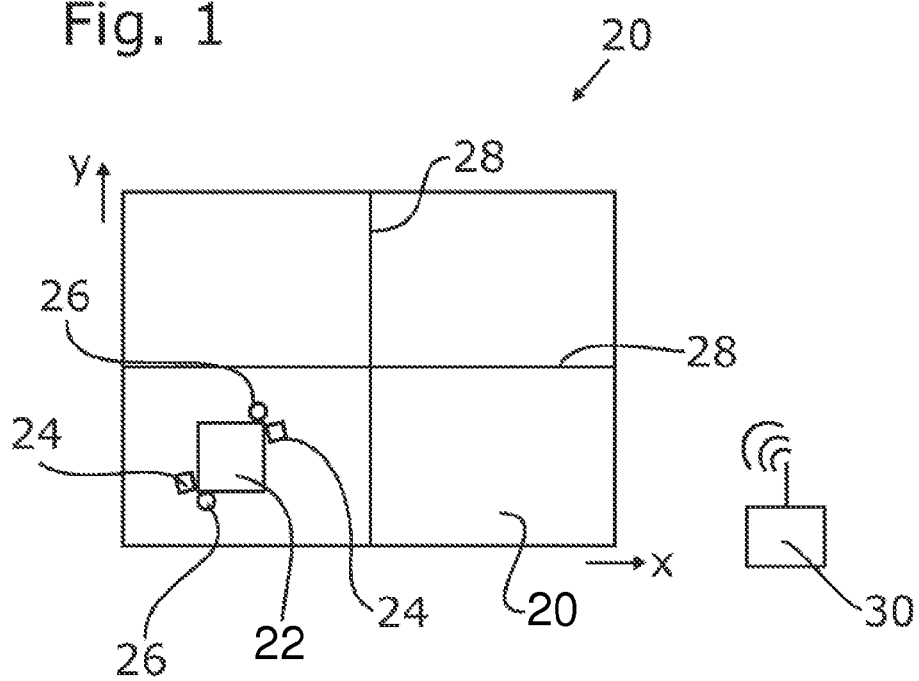
FIG. 1 is a device according to the invention, from above.

FIG. 1 shows a device according to the invention in a highly simplified schematic diagram on a substrate 20. The exemplary embodiment shown depicts a vehicle 22 that can be moved on the substrate 20, preferably by remote control. The vehicle has secured to it two relative sensors 24 and two absolute sensors 26, each in corner areas of the vehicle 22. The relative sensors 24 are used to determine the relative position and orientation of the vehicle 22. The determination of relative parameters is rooted in the fact that such a determination is based on a respective previously determined value, meaning is not objectively determined from scratch. While the relative data are sufficient for many applications, the cumulative errors require that the position and orientation of the vehicle 22 be determined absolutely from scratch at regular intervals, so that the relative determination once again becomes sufficiently accurate thereafter. The absolute sensors 26 are provided for this purpose. The relative sensors 24 are preferably designed as optical sensors resembling a kind of optical computer mouse, and aimed toward the substrate 20.

In the exemplary embodiment shown, the substrate 20 is provided with markings 28 with a known position.

The absolute sensors 26 are aimed toward the substrate 20 and record when the vehicle 22 drives over a marking 28. As soon as a signal from the marking 28 is recorded, the current relative position and orientation data are adjusted to the absolute position and orientation, so that the relative sensors 24 can again deliver very precise data starting at that point as the vehicle 22 drives between the markings 28. The acquired data can be adjusted by way of a computer 30 with a corresponding processor and accompanying software, which is wired or wirelessly connected to the vehicle 22 or sensors 24, 26, or situated directly on the vehicle 22.

The absolute orientation of the vehicle 22 is determined on the substrate 20 by having both absolute sensors 26 each drive over the markings 28, from which the twisting of the vehicle 22 around a vertical axis can then be directly inferred.

While the sensors 24, 26 can be designed as separate sensors, just one sensor that ascertains both the relative and absolute parameters is also conceivable. In this case, then, each vehicle 22 would only require two sensors 24, 26.

Figure 2:
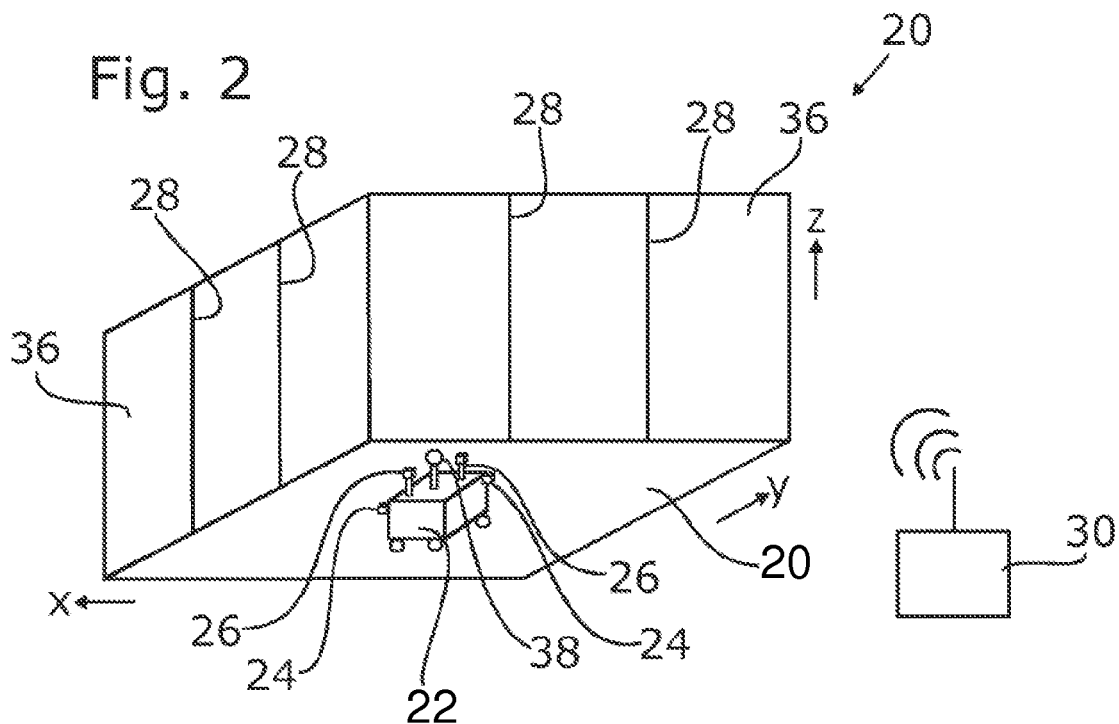
FIG. 2 is a perspective view of a second embodiment of a device according to the invention.

FIG. 2 shows another embodiment of the device, in which the markings 28 are applied to walls 36. The markings 28 are preferably designed as reflectors, and reflect light emitted from a light source 38 secured to the vehicle 22. The accompanying absolute sensor 26 is designed as a CCD line-scanning camera, for example, which detects and recognizes the reflected radiation from at least three markings 28. The markings 28 are each unambiguously coded, so that their known position can be taken as the basis for calculating the absolute position in the vehicle 22. A computer 30 that executes the necessary computations can also be provided in this embodiment.

The major advantage to the device according to the invention and the method according to the invention is that they involve a hybrid system in which more or less precise information can be acquired for determining the position and orientation, depending on the requirements. It is only required that the chronological and/or spatial distances in determining the absolute position be adjusted. It is not necessary to fit the entire substrate 20 with markings 28, since only relative movements only have to be measured most of the time anyway. Only the quick and easy application of a few markings 28 is required. The method and device can be optimally tailored to existing conditions on site.

In an especially advantageous embodiment, any patterns can be used for orientation purposes, or all markings can look identical. The system then learns the position of the markings when initialized or first installed, and can be calibrated. As of that point, the markings are unambiguously allocated (quasi coded), even though they look identical. In like manner, any objects in the room can be used as a reference pattern, and/or fixed objects, such as decorative parts, walls, pedestals and the like can be acquired and used by the optical system The invention is not limited to the described exemplary embodiments, but rather encompasses all embodiments that make use of the underlying idea of the invention.

What is claimed is:

1. A device for determining position and orientation of a movable object, comprising
    at least two relative sensors on the object adapted to register a relative change in at least one of the position and orientation of the object,
    at least two absolute sensors comprising optical sensors on the object, each adapted for determining an absolute position in an X direction and a Y direction in relation to a substrate, and
    a light source located on the object and configured to emit light and illuminate unambiguously coded markings located on surrounding walls at known positions that reflect light emitted by the light source,
    wherein
    the device is adapted to be calibrated by learning the known positions of the unambiguously coded markings when initialized or first installed, and
    the device is configured to receive reflected light from at least three of said unambiguously coded markings and utilize said known positions thereof as a basis for calculating an absolute position of the object.

2. The device according to claim 1, wherein the relative sensors comprise optical sensors.

3. The device according to claim 1, wherein the relative sensors comprise odometers.

4. The device according to claim 1, wherein markings each comprise a simple line.

5. The device according to claim 1, wherein the markings are applied to the surrounding walls in the form of grid lines.

6. A method comprising:
    two-dimensionally determining position and orientation of a movable object with a device comprising at least two relative sensors on the object adapted to register a relative change in at least one of the position and orientation of the object, at least two absolute sensors comprising optical sensors on the object, each adapted for determining an absolute position in an X direction and a Y direction in relation to a substrate, and a light source located on the object and configured to emit light and illuminate unambiguously coded markings located on surrounding walls at known positions that reflect light emitted by the light source, wherein the device is adapted to be calibrated by learning the known positions of the unambiguously coded markings when initialized or first installed, and the device is configured to receive reflected light from at least three of said unambiguously coded markings and utilize said known positions thereof as a basis for calculating an absolute position of the object, the determining step further comprising:

permanently determining a relative position and orientation of the object using the relative sensors, intermittently determining an absolute position and orientation of the object using the absolute sensors by receiving light that is reflected from at least three of the unambiguously coded markings and utilizing said known positions thereof as a basis for calculating an absolute position of the object, and incorporating the absolute position and orientation as an initial value for subsequently determining the relative position and orientation via the relative sensors.

* * * * *